Feb. 4, 1969  Y. P. CARIGNAN  3,425,811
GASOMETER DILATOMETER
Filed April 12, 1965
Prior Art
Fig. 1
Prior Art
Fig. 2
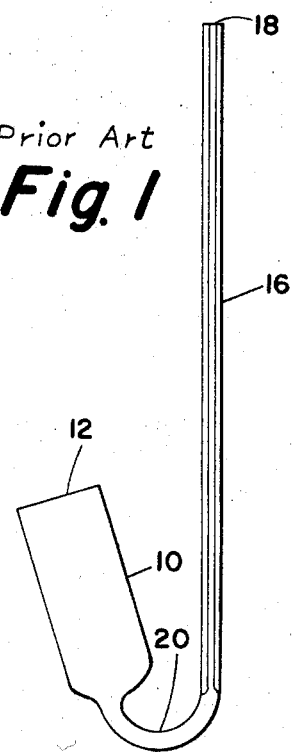
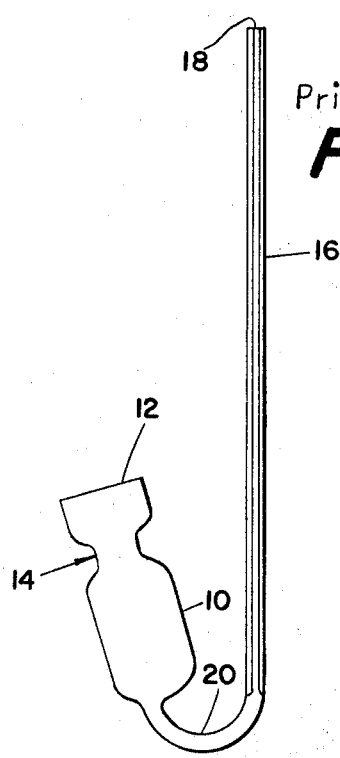
Prior Art
Fig. 3
Prior Art
Fig. 4
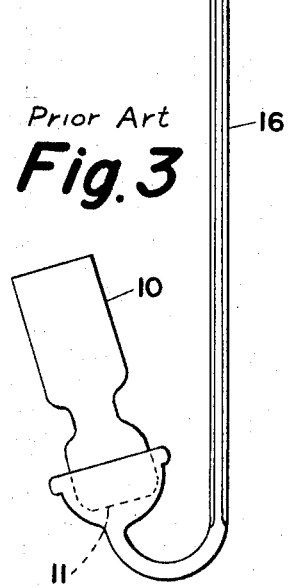
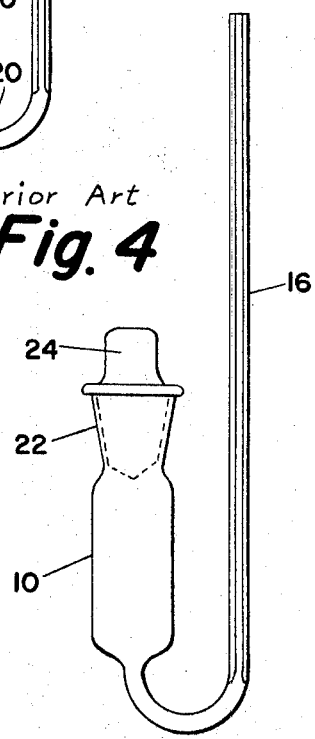
INVENTOR.
YVON P. CARIGNAN
BY Harry M. Saragovitz,
Edward J. Kelly, Herbert Berl
& S. Dubroff
ATTORNEYS Feb. 4, 1969  Y. P. CARIGNAN  3,425,811
GASOMETER DILATOMETER
Filed April 12, 1965  Sheet 3 of 4
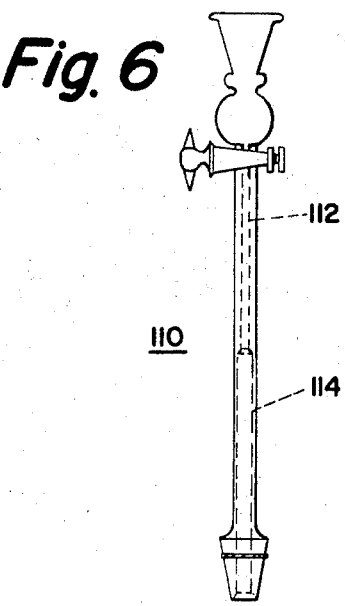
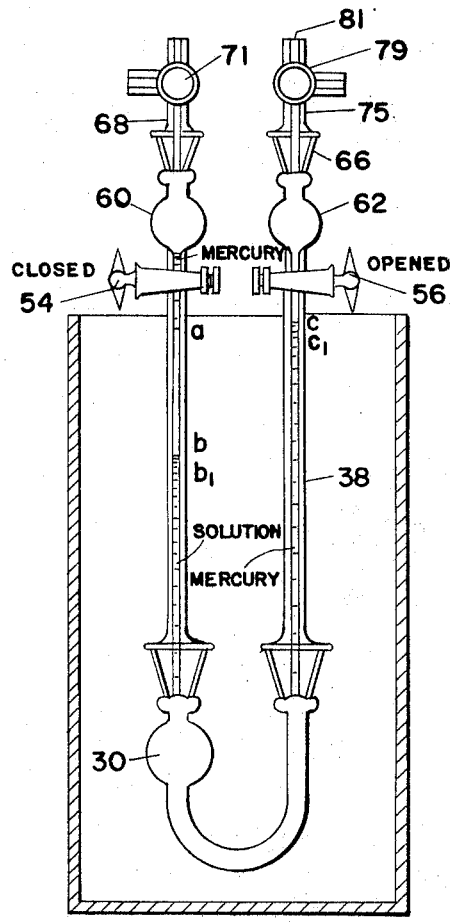
INVENTOR.
YVON P. CARIGNAN
ATTORNEYS

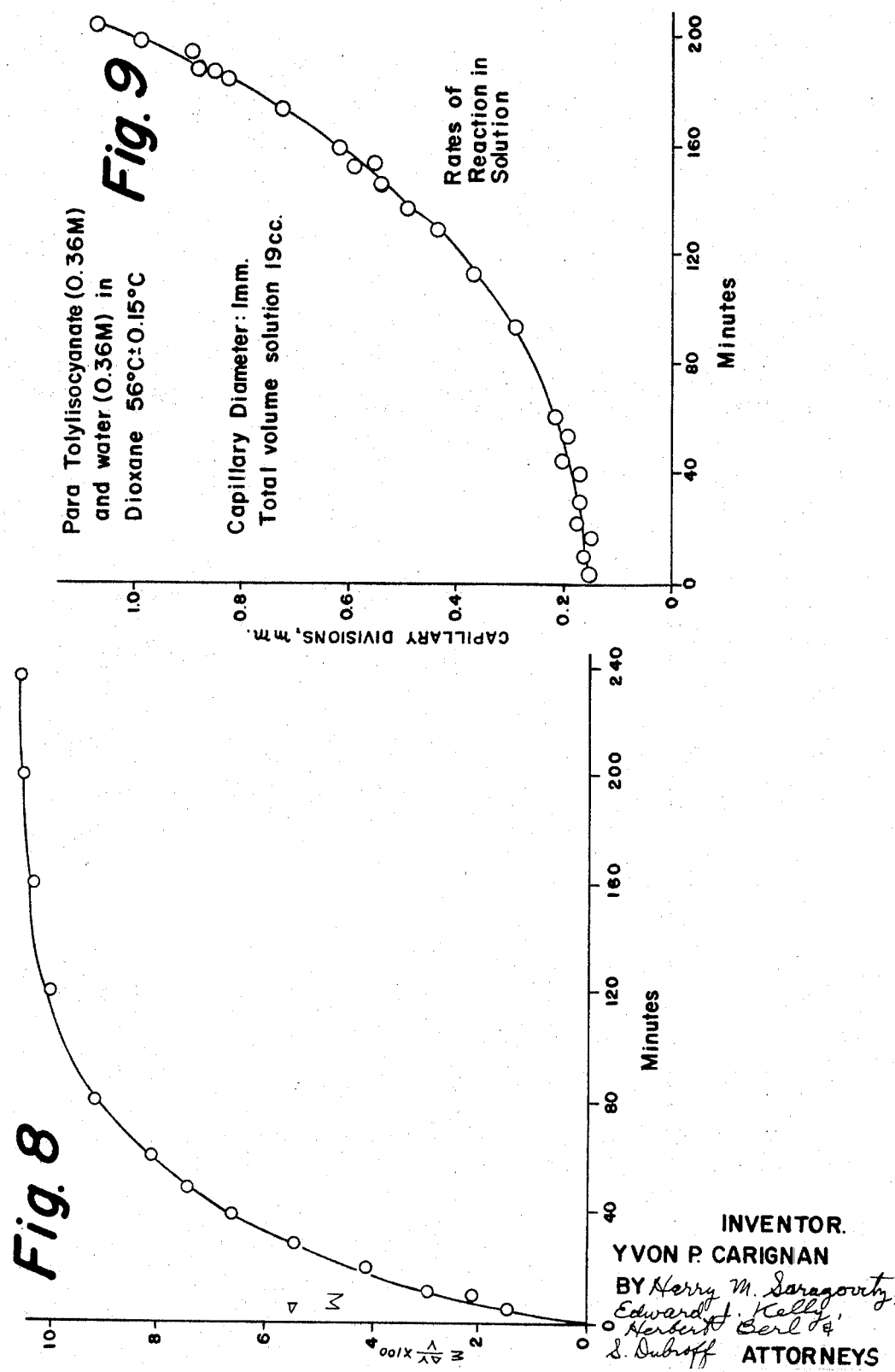

United States Patent Office 3,425,811
Patented Feb. 4, 1969

3,425,811
GASOMETER-DILATOMETER
Yvon P. Carignan, Lebonan Township, Hunterdon County, N.J. (Point Mountain, R.D. 2, Washington, N.J. 07882)
Filed Apr. 12, 1965, Ser. No. 447,585
U.S. Cl. 23—292                                     3 Claims
Int. Cl. B01l 3/00

ABSTRACT OF THE DISCLOSURE

A combination gasometric and dilatometric device capable of measuring rates of reaction under constant and non-constant pressures and even when large amounts of gas are evolved. The device is also capable of permitting aliquots of the sample to be removed therefrom and for measuring volume changes due to reactions, the device comprising a plurality of: reservoirs, tapered greaseless joints and stopcocks, capillary bores and venting and vacuum outlets.

---

The invention described herein may be manufactured and used by or for the Government for governmental purposes without the payment to me of any royalty thereon.

This invention relates to chemical apparatus and more particularly concerns a unique combination gasometer-dilatometer capable of use in a variety of chemical reactions.

Dilatometry affords one of the simplest measurements of chemical reaction rates when there is an appreciable volume difference between reactants and products and includes a great number of chemical reactions and polymerizations. Dilatometry also affords a means of measuring phase transitions including glass temperature of polymers and crystallization of polymers. For many years, chemists have used this elegant technique but to a much lesser extent than other conventional techniques. The lack of appreciation by many chemists for this technique is due largely to the fact that there is no commercial apparatus available with which to accomplish a variety of tasks or because of their lack of simplicity of operation so as to make them attractive to the experimentalist.

In the prior art, three general types of dilatometers are available and are shown in FIGS. 1, 2, 3 and 4. Each of these dilatometers is of such simple construction so as to be unadaptable for anything but a very limited and definite task. It is this principle deficiency in these dilatometers which has led to a lack of general interest in dilatometry technique. Further, the prior art dilatometers suffer other deficiencies which render them incapable of use in a variety of chemical processes. For example, the dilatometers shown in FIGS. 1 and 2 require flame sealing of the reservoir 10 at their openings 12 after introduction of the sample therein, or the reservoir may require constriction at 14 before introduction of mercury and sample to be studied. After the opening is constricted, mercury is introduced into the reservoir and is raised into capillary 16 by application of a vacuum at 18 (not shown). This will be followed by introduction of the sample, freezing of the sample through immersion in a low temperature bath, evacuation at opening 12 to remove gases and any flammable vapors over the frozen sample and finally closing of the constriction at opening 12 by means of a flame. After bringing the device to the temperature chosen for the experiment, the progress of the reaction will be followed by measuring the height of the mercury level in the capillary 16. After completion of the experiment, the sample can be removed only by breaking of the reservoir at opening 12. The deficiencies of these dilatometers may be summarized as follows:

(1) It is virtually impossible to take aliquots of the sample while the reaction is in progress.

(2) It is inconvenient to remove the sample at the end of the experiment for further study since the glass must be broken.

(3) For repeated use of the precision-bore capillary, breakage of the device at a U-tube portion 20 and subsequent welding by flame of new sample reservoirs to the precision-bore capillary is necessary.

(4) If gases are formed during the reaction, these devices make it virtually impossible to use this technique for measuring the rates of reaction since the gases formed cannot be removed and the volume they occupy cannot be determined using these dilatometer constructions.

The dilatometer shown in FIG. 3 is so constructed that it eliminates any need for flame sealing for its operation. It has an attractive feature in that the sample reservoir 10 is demountable from the precision-bore capillary 16 and thus permitting the use of various sizes of reservoirs with the same capillary tubing. However, if gases are formed during reaction, this device renders it impossible to use this technique for measuring rates of reaction since gases formed cannot be removed and their volume cannot be determined. Since the sample reservoir is connected with its outlet 11 facing downwardly, this dilatometer is highly impractical for use with liquid samples unless they are frozen prior to connecting the reservoir to the capillary tubing. Consequently this particular design cannot be regarded as an apparatus of general use for dilatometric measurements but is rather limited to serve a very definite and specific task.

The device of FIG. 4 may be used to measure volume contractions (rates of reaction) without the undesirable operation of flame sealing which is made possible by having the sample reservoir 10 built with a standard tapered ground joint 22 for receiving a mating cap 24. This device obviously is not practical when studying reactions where gases are susceptible of formation. Another undesirable feature of this device is that the sample reservoir 10 and the capillary tubing 16 are of one piece and thus limiting usefulness of the device to certain sample sizes only. Further, the devices of FIGS. 3 and 4 require standard ground joints, either tapered or of the socket type, which necessitate lubrication in order to obtain a seal between joints. The use of grease is undesirable since most dilatometric measurements are done either with organic liquids or organic molecules dissolved in organic solvents and no greases are known at the present time which resist the whole spectrum of organic solvents. Furthermore, since dilatometric measurements are carried out at a constant temperature which is usually achieved by means of a constant temperature bath with water as the heat exchanger, severe requirements as to the type of lubricant which can perform satisfactorily are imposed due to the fact that there is no known lubricant available which is resistant to both water and the common organic solvents. As a result, greases at the joints soon lose their sealing ability under the normal conditions employed in dilatometric measurements.

It is therefore a broad object of this invention to provide a novel dilatometer substantially free of the aforementioned disadvantages.

Another object of the invention is to provide an improved dilatometer capable of adaptation to a variety of processes and characterized by greater ease of operation and greater ease of maintenance, and yet permitting repetitive use on a single instrument.

Still another object of the invention is to provide an improved dilatometer which permits the study of rates of reaction under constant pressure.

A further object of the invention is to provide an improved dilatometer which permits fast removal of the sample without dismantling of the assembly.

A final object of the invention is to provide an unitary apparatus capable of the use in both gasometry and dilatometry.

The exact nature of this invention as well as other objects and advantages thereof will be readily apparent from consideration of the following specification relating to the annexed drawings in which:

FIGS. 1, 2, 3 and 4 are representative of the prior art dilatometers aforedescribed;

FIG. 6 is a modified capillary assembly for use with my device;

FIG. 7 illustrates various liquid heights in my capillary assemblies at a point during a typical reaction; and FIGS. 8 and 9 graphically represent a polymerization rate and reaction rate respectively of typical reactions.

Figure 5:
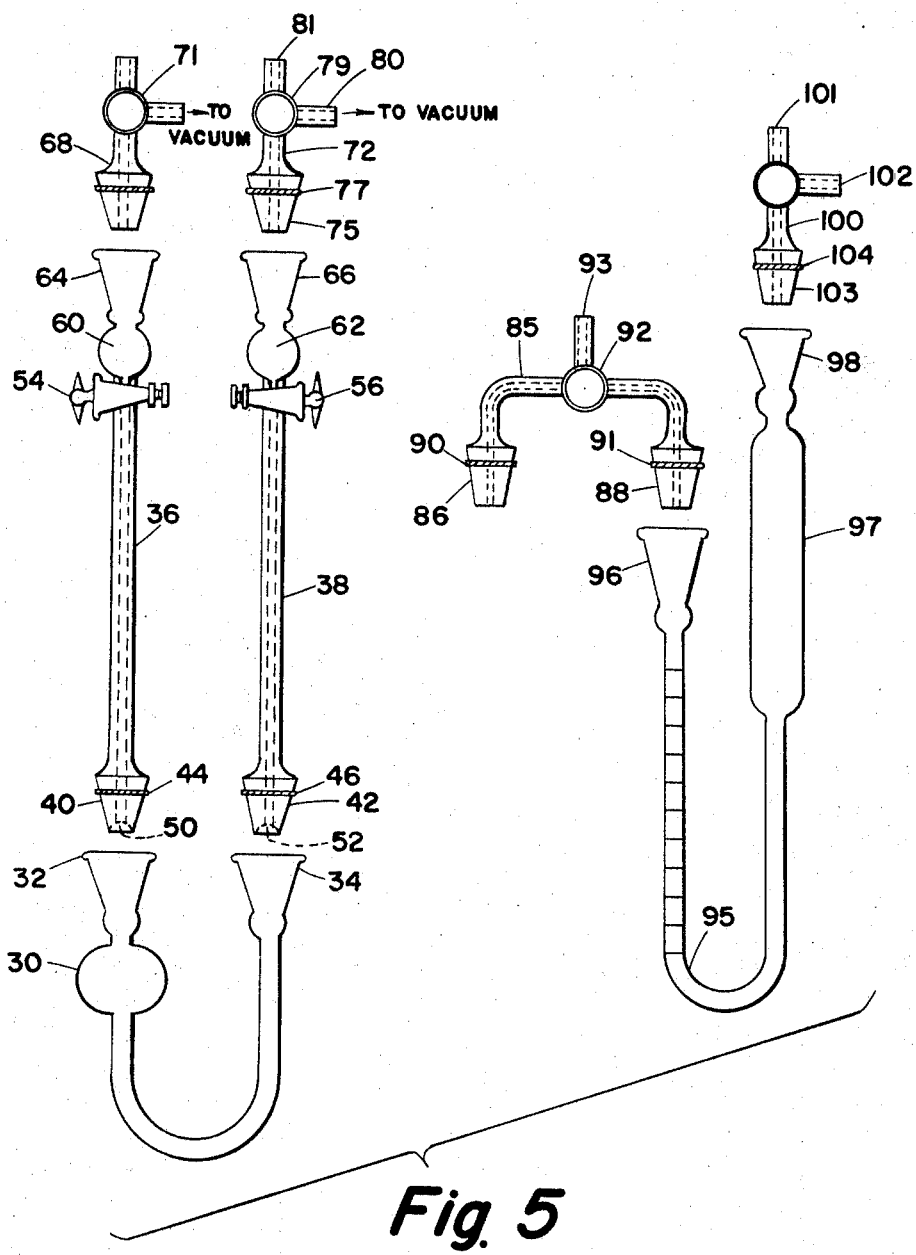
FIG. 5 is an exploded view of a preferred embodiment of my gasometer-dilatometer.

Referring now to FIG. 5 of the drawings, my gasometer-dilatometer comprises a glass sample reservoir 30 for containing the bulk of the sample and terminating into two female greaseless tapered ground joints 32 and 34. Two precision-bored glass capillary tubing assemblies 36 and 38, graduated in mm. divisions, have greaseless standard tapered male ground joints 40 and 42 and O-rings 44 and 46 therearound. The male joints are ground at the bottoms thereof to a concave semi-sphere 50 and 52 to prevent any trapping of gases which might form in reservoir 30. The upper ends of the glass capillaries 36 and 38 terminate in greaseless stopcock valves 54 and 56 respectively which control both the flow of gases and mercury and the rate of evacuation and venting. Above these valves are small reservoirs 60 and 62 and standard greaseless tapered female ground joints 64 and 66. A three-way glass capillary tubing assembly 72 terminates at one end into standard greaseless tapered male ground joint 75 having an O-ring 77 therearound and includes three-way stopcock valve 79 with a glass or Teflon plug and a vent-vacuum outlet 80. The three-way assembly 72 also includes vent or vacuum outlet 81, the assembly being insertable into opening 66 of capillary assembly 38. A similar three-way glass capillary tubing assembly 68 is insertable into opening 64. A pressure equalizer assembly includes a three-way capillary adapter 85 having standard greaseless tapered male ground joints 86 and 88, O-rings 90 and 91, a three-way stopcock 92 and vent outlet 93.

A U-shaped graduated glass tubing 95 has a tapered female greaseless ground joint 96 for receiving male joint 88 and includes a reservoir 97 and a standard tapered female ground joint 98. Another three-way capillary tubing 100 has a pair of vent or vacuum outlets 101 and 102, a tapered greaseless ground-joint 103, O-ring 104, the joint 103 being insertable into female joint 98. The pressure equalizer assembly 85 will be connected to the capillary assembly 38 by means of male joint 86 and female joint 66. The pressure equalizer assembly aforementioned will be used when a constant pressure is desired and will be described hereinafter.

In making determinations where gas is evolved at a rapid rate or where the rate of gas evolution increases with the time of reaction, the precision-bored capillary assembly 36 may be substituted by the modified precision-bored capillary assembly shown in FIG. 6. A special feature of this assembly 110 resides in two precision-bored capillaries 112 and 114 of different diameters. Although not shown in the drawings, male and female joints are kept in relative position by means of well known standard spring clamps.

In the practice of my invention, the following procedure may be followed for those experiments where information on both volume contraction and rates of gas evolution are needed.

First, the entire apparatus is thoroughly cleaned and the capillaries calibrated. It may be advisable in most instances to degas the solutions containing the reactants prior to transferring to the reaction flask.

Second, the calculated quantity of mercury is added into the reaction vessel at 32 using a funnel to prevent contact of the mercury with the female ground joint. The right hand capillary assembly 38 is then fitted into the reaction vessel by inserting male joint 42 into female joint 34 and tightened either with tension hooks or joint clamps. The three-way capillary assembly 72 is connected to the right hand capillary assembly 38 by fitting male joint 75 into female joint 66.

Third, the three-way capillary assembly 72 may now be connected to a vacuum line at 80. By opening the stopcock valve 56, a portion of the mercury will be slowly drawn into capillary assembly 38 and reservoir 62.

Fourth, my gasometer-dilatometer, assembled as aforedescribed, may now be dipped into a constant temperature bath to at least half way up the points at 32 and 34 to allow the bulk of mercury to attain the temperature chosen for the experiment and at the same time permitting both reactants in solution, contained in separate flasks and immersed in the temperature bath, to become equilibrated separately to the same temperature. After several minutes, one reactant will be transferred to reservoir 30, above the mercury, making sure that it does not contaminate the joint at 32. The second reactant will subsequently be transferred to the reservoir 30 and the capillary assembly 36 immediately placed in position by inserting male joint 40 into female joint 32 and tightening with either tension hooks or joint clamps. The apparatus thus assembled will be immersed in the bath up to the zero mark at the upper portion of the capillary tubing assemblies. The time of immersion will be recorded, $t_i$.

Fifth, the stopcock valve 79 is then opened to permit venting thru outlet 81 of the space above stopcock valve 56. With stopcock valve 54 closed, stopcock valve 56 is opened. Then valve 54 will be opened slowly to permit the reactants solution to rise in capillary 36 very slowly up to approximately 5 centimeters below the top mark zero. After closing valve 54, a few drops of mercury are added to reservoir 60. Valve 54 is then opened slowly to allow the mercury in reservoir 60 to descend one or two centimeters in capillary 36.

If, however, the pressure from the column of mercury in capillary 38 prevents the descent of mercury in capillary 36 the following procedure is suggested. With valve 54 still opened and valve 56 closed, valve 79 is opened to the vacuum line at 80. Then valve 56 is opened slowly to allow the mercury in reservoir 60 to flow one or two centimeters into capillary 36.

Valves 54 and 56 are then closed and stopcock valve 79 is opened to permit venting thru outlet 81 of the space above stopcock valve 56.

Sixth, three-way capillary assembly 72 will be removed from capillary assembly 38, valve 56 opened and by means of a syringe the mercury level is set at mark zero in capillary 38 either by removing excess mercury or by adding additional mercury, whatever the case may be. The three-way capillary assembly 72 is reconnected at 66 and the three-way capillary assembly 68 is connected. At this point, valve 56 is opened, both valves 79 and 71 opened to vent, and valve 54 is closed. The whole assembly should be in the position shown in FIG. 7.

The time, $t_1$, and the levels at $a$, $b$, and $c$ are recorded. The whole sequence of operations between $t_i$ and $t_1$ will be of the order of less than two minutes.

During the progress of the reaction, gas will be formed and contraction of the solution will occur. To record this progress at various intervals of time, the following procedure is suggested:

Seventh, the device, as assembled, is gently shaken in order to permit the escape of gases from the bulk of the solution into the capillary 36. To insure that no gas is being trapped underneath male joint 40, stopcock 79 is opened to the vacuum line at vent 80 with stopcock valve 56 opened. Next, valve 54 is opened slowly to allow both the mercury level at $a$ of FIG. 7 and solution level at $b$ to descend the capillary 36 very slowly until the solution level $b$ is below the capillary entrance. Both valves 54 and 56 are then closed and stopcock 79 vented at 81. Stopcock 71 is opened to vacuum and valves 54 and 56 opened to bring mercury level in capillary 36 back to its original position $a$. Valve 54 is then closed. The time, $t_2$, and the solution level in capillary 36 is recorded $b_1$. Next, stopcock valve 54 is opened again to raise the solution level at $b_1$ to its original position $b$. Valve 54 is then closed. A record of the time, $t_3$, and of the mercury level in capillary 38 is recorded $c_1$. Step 7 aforedescribed will measure the rates of gas formation as well as the overall rate of reaction.

In calculating the quantity of gas formed during an interval of time, $t$, equation 1 below will be used:

(1) $x = b_1 - b$ where $x$ = amount of gas formed during time interval $t_2 - t_1$ Similarly, to calculate the rate of reaction from the volume contraction, Equation 2 below will be used:

(2) $y = c_1 - c$ where $y$ = linear contraction during time interval, $t_3 - t_1$ Now by plotting the values from Equations 1 and 2 above against times of reaction a rate curve for the process under study may readily be obtained. Of course, by knowing the bore diameters, actual volumes can easily be calculated.

When it is desired to carry out reactions under constant pressures, the pressure equalizer assembly of FIG. 5, including three-way capillary adapters 85 and 100 and U-shaped glass tubing 95 will be used. In the drawing of FIG. 5, it will be apparent that the solution in reservoir 30 and thereabove will be reacting under a pressure of mercury generally defined by its level at $c$ (FIG. 7). During the reaction however, the mercury level at $c$ will drop and thus decrease the pressure under which the solution reacts. In order to maintain a constant pressure, assembly 72 will be removed from female joint 66 and three-way assembly 85 inserted therein. Mercury will be added to U-tube 95 and the assembled pressure equalizer assembly connected to vacuum at 102 with stopcock 92 opened until the vacuum created in the space comprised between the mercury levels at 38 and at 95 is sufficient to counter balance the weight of the mercury column in 38 or simply to keep a small positive mercury pressure over the reacting solution. With the progress of the reaction, due to contraction of the solution, the mercury column in capillary 38 will descend with a resulting lowering in mercury pressure over the solution. This is compensated by control venting at 101 thus decreasing the vacuum above the mercury level at 38.

The modification shown in FIG. 6 will be used as a gasometric as well as a dilatometric device when larger amounts of gas are evolved and will replace capillary tubing 36 of FIG. 5. The purpose of the larger diameter bore 114 is to accommodate larger quantities of evolved gas in those reactions where gas evolution would quickly fill up a bore of smaller dimensions.

FIG. 8 graphically represents rate of polymerization in bulk of 2 ml. acrylate ester having a general formula $CH_2=CH-CO-OR$ in the presence of 0.10 gm. of benzyl peroxide catalyst at $60°$ C. $\pm 0.25°$ C. using a capillary diameter of 1 mm. The results are expressed as percent contraction in going from a pure monomer to pure polymer.

FIG. 9 illustrates a reaction between p-tolyl isocyanate (0.36 M) and water (0.36 M) in dioxane measured at $56°$ C. $\pm 0.15$ C. where the change in height of the mercury column was plotted against time. The capillary diameter used was 1 mm. and the total volume solution was 19 cc.

It is apparent from the foregoing description that I have provided a gasometer-dilatometer devoid of many of the disadvantages inhering in currently available dilatometers and yet being capable of ready adaptation to a variety of processes. My device is characterized by ease of operation, maintenance and fabrication while permitting repetitive use and constant pressure rate of reaction studies.

I claim:

1. A combined gasometric and dilatometric device for carrying out chemical reactions under constant pressures comprising
    a pair of upturned openings communicating with each other through a sample reservoir for containing bulk of sample, one of said pair communicating with an upper portion of said reservoir and the other of said pair communicating with a lower portion of said reservoir,
    a bored capillary assembly removably insertable in each of said upturned openings, said capillary assembly having a tapered male joint at its lower portion for gas-tight insertion into said upturned opening,
    a valve at an upper portion of each of said capillary assemblies for opening and closing its respective capillary bore, a reservoir and a turned-up opening above each of said valves,
    a pressure equalizer assembly having a 3-way capillary adapter communicating with a first tapered male joint and a second tapered male joint, said first tapered male joint being sealably insertable into that bored capillary assembly turned-up opening which communicates with said lower portion of said sample reservoir,
    a U-shaped graduated tube having a first opening for receiving said second tapered male joint of said pressure equalizer assembly, said U-shaped tube having a second opening and a reservoir communicating between said first and said second opening, and
    a 3-way capillary tubing having a male fitting removably insertable into said second opening of said U-shaped tube, said 3-way capillary tubing having a vent and vacuum outlet.

2. A combined gasometric and dilatometric device for measuring volume changes due to reactions comprisng
    a pair of upturned openings communicating with each other through a sample reservoir for containing bulk of sample, one of said pair communicating with an upper portion of said reservoir and the other of said pair communicating with a lower portion of said reservoir,
    at least one bored capillary assembly removably insertable in each of said upturned openings, said capillary assembly having a tapered male joint at its lower portion for gas-tight insertion into said upturned opening.
    a valve at an upper portion of each of said bored capillary assemblies for opening and closing its respective capillary bore, a reservoir and a turned-up opening above each of said valves, and
    at least one 3-way capillary tubing assembly having a male fitting removably insertable into each of said turned-up openings of said bored capillary assembly, each of said 3-way capillary tubing assemblies having a vent and vacuum outlet.

3. The device of claim 2 further characterized by one of said capillary assemblies having a multi-dimensioned bore.

(References on following page)

References Cited

UNITED STATES PATENTS

| | | | |
|---|---|---|---|
| 2,680,060 | 6/1954 | Matelson | 23—254 XR |
| 2,974,018 | 3/1961 | McNeilly | 23—253 |
| 3,140,097 | 7/1964 | Luertzing | 287—189.365 |

MORRIS O. WOLK, *Primary Examiner.*

R. M. REESE, *Assistant Examiner.*

U.S. Cl. X.R.

23—253; 73—16